United States Patent [19]

Austin et al.

[11] 3,725,383
[45] Apr. 3, 1973

[54] 2-HYDROXY-PYRID-6-ONE AZO DYESTUFFS CONTAINING A CELLULOSE FIBER REACTIVE SUBSTITUENT

[75] Inventors: Peter William Austin; Allen Crabtree; John Lindley Leng; Denis Robert Annesley Ridyard; Elliott Young, all of Manchester, England

[73] Assignee: Imperial Chemical Industries Limited, London, England

[22] Filed: May 20, 1971

[21] Appl. No.: 145,505

[30] Foreign Application Priority Data

July 10, 1970   Great Britain......................33,634/70

[52] U.S. Cl.........260/146 T, 260/146 R, 260/146 D, 260/153, 260/154, 260/155, 260/156, 260/249.5, 260/250 R, 260/250 A, 260/251 Q, 260/256.4 R, 260/294.8 R, 260/294.8 D, 260/294.8 E, 260/295, 260/296
[51] Int. Cl.....C09b 29/36, C09b 62/08, C09b 62/24
[58] Field of Search.......................260/146, 156, 155

[56] References Cited

FOREIGN PATENTS OR APPLICATIONS 1,420,406   2/1968   France ................................260/156

Primary Examiner—Floyd D. Higel
Assistant Examiner—Robert W. Ramsuer
Attorney—Cushman, Darby and Cushman

[57] ABSTRACT

Azo dyestuffs of the general formula:

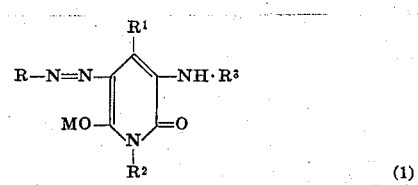

(1)

wherein R represents an aromatic radical which may contain one or more further azo groups, M represents H or a metal atom forming part of a metal-complex system in the dyestuff, $R^1$ represents an alkyl group or a phenyl radical which may be substituted, e.g., by lower alkyl, lower alkoxy or chlorine, $R^2$ represents a hydrogen atom, an alkyl, aralkyl or cycloalkyl group or a phenyl radical which may be substituted, e.g., by lower alkyl, lower alkoxy or halogen, and $R^3$ represents a hydrogen atom, a heterocyclic radical containing a cellulose-reactive substituent, or the acyl radical of an organic carboxylic or sulphonic acid which may or may not contain a cellulose-reactive substituent are valuable dyestuffs for a variety of substrates. For example those containing $SO_3H$ groups and a fiber-reactive group are valuable for dyeing and printing of cellulose polyamide and wool textile materials while those which are free from complex metal groups and sulphonic acid groups may be used as disperse dyestuffs.

4 Claims, No Drawings

2-HYDROXY-PYRID-6-ONE AZO DYESTUFFS CONTAINING A CELLULOSE FIBER REACTIVE SUBSTITUENT

This invention relates to new azo dyestuffs and more particularly to new azo dyestuffs of the 2-hydroxy-pyrid-6-one series.

According to the invention there are provided azo dyestuffs of the general formula:

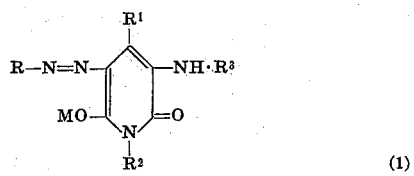

(1)

wherein R represents an aromatic radical which may contain one or more further azo groups, M represents H or a metal atom forming part of a metal-complex system in the dyestuff, $R^1$ represents an alkyl group or a phenyl radical which may be substituted, e.g., by lower alkyl, lower alkoxy or chlorine, $R^2$ represents a hydrogen atom, an alkyl, aralkyl or cycloalkyl group or a phenyl radical which may be substituted, e.g., by lower alkyl, lower alkoxy or halogen, and $R^3$ represents a hydrogen atom, a heterocyclic radical containing a cellulose-reactive substituent, or the acyl radical of an organic carboxylic or sulphonic acid which may or may not contain a cellulose-reactive substituent.

The optionally substituted alkyl groups which may be represented by $R^1$ may be any alkyl group but are preferably lower alkyl groups, and as specific examples of such groups there are mentioned methyl, ethyl, n-propyl and n-butyl, hydroxy alkyl groups such as β-hydroxyethyl, alkoxyalkyl groups such as β-ethoxyethyl. cyanmethyl, carbamoylmethyl, carbethoxymethyl and acetylmethyl.

As examples of optionally substituted phenyl radicals which may be represented by $R^1$ there may be mentioned phenyl, o-, m-, and p-tolyl, 4-methoxyphenyl, and 2-,3-, and 4-chlorophenyl.

As examples of groups which may be represented by $R^2$ there are mentioned optionally substituted alkyl and phenyl groups given above for $R^1$ and also substituted alkyl groups such as β-aminoethyl, γ-dimethylaminopropyl, γ-methoxypropyl, acetylaminoethyl and β-pyridinium ethyl, optionally substituted aralkyl groups such as benzyl and p-methoxybenzyl, substituted amino groups such as dimethylamino and anilino, cycloalkyl groups such as cyclohexyl and o-methylcyclohexyl, and substituted phenyl groups such as 4-aminophenyl, 4-bromophenyl, 4-acetylaminophenyl, 4-ω-pyridiniumacetylaminophenyl, 3-trimethylammonium phenyl, 3-pyridiniummethyl-4-methylphenyl and 3-N,N,N,N-tetramethylisothiouroniummethyl--4-methylphenyl.

Through this specification, the term "cellulose-reactive substituent" means an atom or group capable of reacting with the hydroxyl groups of cellulose with formation of a covalent bond, and the term 'lower' used in connection with 'alkyl' or 'alkoxy' means "containing up to 4 carbon atoms."

Depending on the meaning of the symbols $R^1$ and $R^2$, but more especially M, R and $R^3$, formula (1) represents a wide range of dyestuffs having a variety of uses. Thus where the dyestuff as a whole is free from $SO_3H$ or $CO_2H$ groups and has at most 2 azo groups, it can be used in general as a disperse dyestuff for coloration of a e.g., acetate, nylon or polyester fibers. When the dyestuff contains a quaternary amino group it can be used in general for the coloration of acrylic fibers. When the dyestuff contains at lease one $SO_3H$ group and a plurality of azo groups it can be used as a direct dye for cellulose. Monoazo or disazo dyes containing one or more sulphonic acid groups, also 1:2 metal complex dyes can be used for dyeing silk, wool and nylon. Monoazo or disazo dyes containing one or more $SO_3H$ groups, and a cellulose-reactive group can be used as reactive dyes for silk, wool, nylon and natural and regenerated cellulose fibrous materials.

Thus, a preferred group of dyestuffs are those in which at least one of the radical represented by R and $R^3$ in formula (1) is itself, or contains a cellulose reactive substituent and either or both contain at least one sulphonic acid or carboxylic acid group.

As examples of cellulose or polyamide reactive groups there may be mentioned vinyl sulphone and aliphatic sulphone groups which contain a halogen atom or sulphate ester groups in β-position to the sulphur atom, e.g., β-chloroethyl- or β-sulphatoethyl-sulphone and β-sulphato-ethylsulphonylamino groups, α,β-unsaturated acyl radicals of aliphatic carboxylic acids for example, acrylic acid, α-chloro-acrylic acid, propiolic acid, maleic acid and mono- and dichloro-maleic acids; also the acyl radicals of acids which contain a substituent which reacts with cellulose or polyamides in the presence of an alkali, e.g., the radical of a halogenated aliphatic acid such as chloroacetic acid, β-chloro and β-bromo-propionic acids and α,β-dichloro- and -dibromo- propionic acids. Other examples of cellulose or polyamide - reactive groups are tetrafluoro cyclo butane carbonyl, trifluoro-cyclo butene carbonyl, tetrafluorocyclobutylethenyl carbonyl, trifluorocyclobutaneethenylcarbonyl, and heterocyclic radicals which contain 2 or 3 nitrogen atoms in the heterocyclic ring and at least one cellulose- or polyamide- reactive substituent on a carbon atom of the ring.

As examples of such heterocyclic radicals, there may be mentioned, for example 2:3-dichloro-quinoxaline-5- or -6-sulphonyl, 2:3-dichloro-quinoxaline-5 or -6-carbonyl, 2:4-dichloro-quinazoline-6- or -7-sulphonyl, 2:4:6-trichloro-quinazoline-7- or -8-sulphonyl, 2:4:7- or 2:4:8-trichloro quinazoline-6-sulphonyl, 2:4-dichloro-quinazoline-6-carbonyl, 1:4-dichloro-phthalazine-6-carbonyl, 4:5-dichoro-pyridazon-1-yl, 2:4-dichloro-pyrimidine-5-carbonyl, 1-(phenyl-4-carbonyl)-4:5-dichloro-pyridazone, 1-(phenyl-4-sulphonyl)-4:5-dichloro-pyridazone, and, more particularly striazin-2-yl and pyrimidin-2-yl or -4-yl radicals which contain on at least one of the remaining 2,4- and 6-positions, a bromine or, preferably, a chlorine atom, a sulphonic acid group, a thiocyanate group, an aryloxy or arylthio group containing an electronegative substituent such as sulphophenoxy, sulphophenylthio, nitrosulphophenoxy, disul-phophenoxy and sulphonaphthoxy, or a group of the formula:

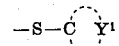

(2)

wherein $Y^1$ represents a group of atoms necessary to form a 5- or 6- membered heterocyclic ring which may carry substituents or form part of a fused ring system; or a quaternary ammonium or pyridinium group; or a group of the formula:

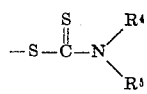  (3)

wherein $R^4$ and $R^5$ each represents the same or different alkyl, cyclo-alkyl, aryl or aralkyl group, or $R^4$ and $R^5$ together form, together with the nitrogen atom, a 5- or 6- membered heterocyclic ring; or a group of the formula:

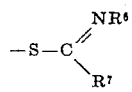  (4)

wherein $R^6$ and $R^7$ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye. As examples of such substituents, there may be mentioned, for example, primary amino and hydroxyl groups, also mono- or di-substituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain substituents for example, hydroxyl or alkoxy groups, and phenylamino and naphthylamino groups preferably containing sulphonic acid substituents; in the case of etherified hydroxyl and mercapto groups, this class includes, for example, alkoxy and alkylthio groups preferably those of low molecular weight, i.e., having up to 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di-(β-hydroxyethyl)-amino, β-chloroethylamino, cyclohexylamino, anilino, sulphophenyl-amino, disulphophenylamino, N-methylsulphophenylamino, N-β-hydroxyethylsulphophenylamino, mono-, di-, and trisulphonaphthylamino, sulpho-o-toluylamino, carboxyphenylamino and sulphocarboxyphenylamino, N-ω-sulphomethylphenylamino methoxy, ethoxy, and butoxy, phenoxy, methyl-phenoxy, chlorophenoxy and phenylthio groups. Chlorine atoms or cyano, nitro, carboxy and carbalkoxy groups in the 5-position of a pyrimidyl radical come into the category of non-reactive substituents.

Thus, in formula (1) above, the symbol R may represent a radical of the benzene or naphthalene series which contains the cellulose- or polyamide - reactive group bound directly in some cases to a nuclear carbon atom but more usually is bound to a nuclear carbon atom through a linking amino group. Typical radicals include for example, not only phenyl and naphthyl, but also stilbene, diphenyloxide, diphenylmethane, diphenylurea, diphenoxyethane and diphenylamine radicals, which contain at least one, and preferably two, sulphonic acid groups.

A related class of the new dyestuffs are metal complex azo dyestuffs in which a metal atom is complexly bound to a metallizable group in R ortho to the azo group and to the hydroxyl of the pyridone nucleus. These dyes include, e.g., 1:1-copper and nickel and 1:2-chromium and cobalt complexes.

A further class of metal complex reactive dyes are chromium and cobalt complexes containing only one mole of an azo dye of the above formula which may or may not contain a cellulose or polyamide-reactive group in R or $R^3$, and a second ligand which may be a different azo dyestuff or a colorless polydentate ligand which contains a cellulose-reactive group attached thereto.

The new dyestuffs may be obtained by a variety of methods. In the case of water-soluble dyes containing $SO_3H$ or $CO_2H$ groups, they may be obtained by coupling a diazotized aromatic amine or tetraazotized aromatic diamine containing such groups with a compound of the formula:

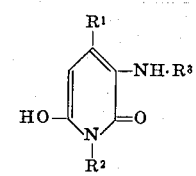  (5)

wherein $R^1$, $R^2$ and $R^3$ have the meanings stated above.

The dyestuff wherein $R^3$ is a hydrogen atom can be obtained by hydrolysis of dyes wherein $R^3$ is an acyl radical.

Compounds of formula (5) wherein $R^3$ has a meaning other than H can be obtained by reaction of the halide or anhydride of a compound of formula $R^3OH$, with the corresponding compound in which $R^3$ represents H, i.e., an amino compound of the formula:

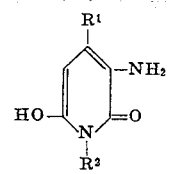  (6)

which, in turn may be obtained by reduction of a compound of the formula:

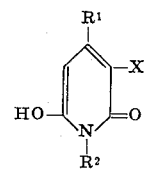  (7)

wherein X represents a nitro, nitroso or arylazo group.

As examples of compounds of formula 5 which may be used, there may be mentioned:

1-ethyl-4-methyl-3-acetylamino-6-hydroxypyrid-2-one,
1,4-dimethyl-3-acetylamino-6-hydroxypyrid-2-one,
1-ethyl-4-phenyl-3-acetylamino-6-hydroxypyrid-2-one,
1-phenyl-4-methyl-3-acetylamino-6-hydroxypyrid-2-one,
1-benzyl-4-methyl-3-benzoylamino-6-hydroxypyrid-2-one,
4-methyl-3-(4'-methylphenylsulphonyl)amino-2,6-dihydroxy-pyridine,
1-ethyl-4-methyl-3-acryloylamino-6-hydroxyprid-2-one,
1-n-propyl-4-methyl-3-(2',4'-dichloropyrimidine-5-car-bonyl)amino-6-hydroxypyrid-2-one,
1-isopropyl-4-methyl-3-(2'-chlorobenzthiazole-6-carbonyl)-amino-6-hydroxypyrid-2one,
1-(3'-chlorophenyl)-4-ethyl-3-(2', 3'-dichloroquinoxaline-6-carbonyl)amino-6-hydroxypyrid-2-one,
1-(4'-methyphenyl)-4-phenyl-3-($\beta$-[4',5'-dichloropyridazonyl-1'-]-proprionyl-)-amino-6-hydroxyprid-2-one,
1-3',5'-dichlorophenyl-4-methyl-3-(1',4'-dichlorophthalazine-6'-carbonyl)amino-6-hydroxyprid-2-one,
1-$\alpha$'-napthyl-4-(4'-methoxyphenyl)-3-$\beta$-phenysulphonylproprionyl-amino-6-hydroxypyrid-2-one,
1-(4'-methoxyphenyl)-4-phenyl-3-$\beta$-sulphatopropionamido-6-hydroxy-pyrid-2-one,
1-benzyl-4-methyl-3-$\beta$-sulphatoethylsuphonamido-6-hydroxypyrid-2-one,
1-$\gamma$-methoxypropyl-4-methyl-3-$\alpha$-chloroacrylamido-6-hydroxypyrid-2-one,
1,4-dimethyl-3-$\alpha$,$\beta$-dichloropropionamido-6-hydroxypyrid-2-one,
4-methyl-3-(tetrafluoro-cyclo-butanoyl)amino-2,6-dihydroxypyridine,
1-ethyl-4-methyl-3-(trifluoro-cyclo-butenoyl)amino-6-hydroxypyrid-2-one,
1-methyl-4-phenyl-3-(tetrafluorocyclobutylethenylcarbonyl)amino-6-hydroxypyrid-2-one,
1-n-butyl-4-methyl-3-(2',3'-dichloroquinozaline-6'-sulphonyl)amino-6-hydroxypyrid-2-one,
1-iso-butyl-4-methyl-3-(2',4',6'-trichloroquinazoline-8'-sulphonyl)amino-6-hydroxyprid-2-one,
1-lauryl-4-methyl-3-(4',5'-dichloropyridazon-1'-yl)amino-6-hydroxy-pyrid-2-one,
1-ethyl-4-methyl-3-(2' or 4',6'-dichloropyrimid-4' or 2'-yl)amino-6-hydroxyprid-2-one,
1-n-propyl-4-methyl-3-(2' or 4',5',6'-trichloropyrimid-4' or 2'-yl)amino-6-hydroxyprid-2-one,
1,4-dimethyl-3-(4',6'-dichloro-s-triazin-2'-yl)amino-6-hydroxypyrid-2-one,
1-ethyl-4-methyl-3-(4',6'-dichloro-s-triazin-2'-yl)amino-6-hydroxy-pyrid-2-one,
1-ethyl-4-methyl-3-[4'-(3''-sulphophenylamino)-6'-chloro-s-triazin-2'-yl]amino-6-hydroxypyrid-2-one,
1-ethyl-4-methyl-3-(4'-methoxy-6'-chloro-s-triazin-2'-yl)amino-6-hydroxypyrid-2-one,
1-ethyl-4-methyl-3-(4'-N-$\omega$-sulphomethylanilino-6'-chloro-s-triazin-2'-yl)amino-6-hydroxypyrid-2-one,
1,4-dimethyl-3-[4'-(6''-sulphonaphth-2''-ylamino)-6'-chloro-s-triazin-2'-yl]amino-6-hydroxypyrid-2-one,
1,4-dimethyl-3-[4'-(4''-sulphophenoxy)-6'-chloro-s-triazin-2'-yl]amino-6-hydroxypyrid-2-one,
1-ethyl-4-methyl-3-[-4'''-(4' (4'''',6''''-dichloro-s-triazin-2'''-yl amino)-2'',5''-disulphophenylamino)-6'-chloro-s-triazin-2'-yl]amino-6-hydroxypyrid-2-one,
1-ethyl-4-methyl-3-[-4'-(3''- 4'''-amino-6'''-chloro-s-triazin-2'''-yl amino-4''-sulphophenylamino)-6'-chloro-s-triazin-2'-yl]-amino-6-hydroxypyrid-2-one,
4,4'-[2-chloro-4-(1-ethyl-4-methyl-6-hydroxypyrid-2-one-3-ylamino)-6-s-triazinylamino]diphenylurea-2,2'-disulphonic acid,
4,4'-[2-chloro-4-(1-phenyl-4-methyl-6-hydroxyprid-2-one-3ylamino)-6-s-triazinylamino]-diphenoxyethane-2-,2'-disulphonic acid, and, as an example of compounds of formula (6), 3-amino-1-ethyl-6-hydroxy-4-methylpyrid-2-one.

As examples of aromatic amines and diamines which may be used, there may be mentioned:- aminoazobenzene mono- and di-sulphonic acids, orthanilic, metanilic and sulphanilic acids, 2-, 3- and 4-aminobenzoic acids, aniline-2,4-, -2,5-and -3,5-disulphonic acids, 4-methoxy aniline-2- and -3-sulphonic acids, 2-methoxy aniline-5-sulphonic acid, 5-amino-2-hydroxy-3-sulphobenzoic acid, 4- and 5-acetylaminoaniline-2-sulphonic acids, 5-acetylamino-2-aminobenzoic acid, 4- and 5-(2',4'-dichloro-s-triazin-6'-ylamino)-aniline-2-sulphonic and 2,5- and 2,4- disulphonic acids, 4- and 5-(chloro-chloro-4'-amino-s-triazin-6'-ylamino)aniline-2-sulphonic and 2,5- and 2,4- disulphonic acids, 4- and 5-(2'-chloro-4'-metanilino-s-triazin-6'-ylamino)aniline-2-sulphonic and 2,5-and 2,4-disulphonic acids, 4- and 5-(2'-chloro-4'-sulpho-o-toluidino-s-triazin-6'-ylamino)aniline-2-sulphonic-and 2,5- and 2,4-disulphonic acids,chloro- and nitro- aniline sulphonic acids, aniline-5-sulphonanilide-2-sulphonic acid, aniline-5-sulphon-N-ethylanilide-2-sulphonic acid, 4-amino-4'-nitrodiphenylamine-2'-sulphonic acid, 4-amino-2'-nitrodiphenylamine-4'-sulphonic acid, 1-aminonaphthalene-4-, -5-, -6- 7- and 8-sulphonic acids, 2-aminonaphthalene-1-, -4-, -5-, -6-, -7- and -8- sulphonic acids, 1-aminonaphthalene-3,6-disulphonic acid,2-aminonaphthalene-1,5-, -3,6--4,8-, -5,7- and -6,8- disulphonic acids, 1- and 2-aminonaphthalene trisulphonic acids, 4-nitro-4'-aminostilbene-2,2'-disulphonic acid, 4- and 5 -sulpho-2-aminobenzoic acids, 6-chloro-, 6-nitro- and 6-acetylamino-2-aminophenol-4-sulphonic acids, 2-aminophenol-4- and -5-sulphonic acids and -4,6-disulphonic acid, 3-amino-2-hydroxy-6-sulpho-benzoic acid, 4-chloro- and 4-nitro-2-aminophenol-6-sulphonic acids, 1-amino-2-hydroxynaphthalene-4-sulphonic acid, 6-nitro-1-amino-2-hydroxynaphthalene-4-sulphonic acid, 1,3-phenylene diamine -4,6-disulphonic acid, 1,4-phenylene diamine-2,5-disulphonic acid, 4,4'-diaminodiphenyl-2- and -3-sulphonic acids, 4,4'-diaminodiphenyl-2,2'- and -3,3'-disulphonic acids, 2,6-naphthylene diamine-1,5- and -3,7-disulphonic acids, 6-acetylamino-2-naphthylamine-4,8-disulphonic acid, 4,4'-diaminodiphenyl urea-2,2'-and 3,3'-disulphonic acids, and 4,4'-diaminostilbene-2,2'-disulphonic acid.

The metal-complex dyes can be obtained by coupling a compound of formula (5) with the diazonium salt from an aromatic amine which contains a hydroxyl carboxylic acid or alkoxy group ortho to the amino group and subjecting the resultant azo compound to metallization, to form a heavy-metal complex, e.g., a copper, nickel, chromium or cobalt complex, of the azo compound. The metallization can be effected, for example, by treatment in in an aqueous medium with a salt of the metal, e.g., chromium sulphate, cobalt acetate, cobalt sulphate, copper sulphate and copper acetate. In some cases it is preferable to use a complex metal salt, e.g., in the form of a metal amine complex, such as the copper amine sulphates obtained from copper sulphate and ammonia, pyridine or ethanolamine. Other suitable metallization agents are those wherein the metal forms part of a complex anion, e.g., chromium complexes of organic hydroxy-carboxylic acids, e.g., salicyclic acid, or complexes of copper or cobalt with aliphatic amino- or hydroxy carboxylic acids, e.g., glycollic acid, lactic acid and tartaric acid.

The treatment with the metallization agent can be carried out by methods known per se, at ambient or slightly elevated temperatures, or, where a de-alkylating treatment is involved, by heating at a temperature of from 50° to 120° C in an open vessel under reflux or in a closed vessel under pressure at a pH suitable for the chosen reaction, e.g., an acid coppering with copper sulphate or an alkaline coppering with cuprammonium sulphate.

The new dyestuff and their heavy metal complexes which contain an acylamino group in R or on the pyridone nucleus, i.e., wherein $R^3$ of formula (1) is an acyl group not capable of reaction with the cellulose molecule can, after hydrolysis to form an amino group in the 3-position of the pyridone nucleus, be converted to a cellulose or polyamide- reactive dyestuff by condensation with the anhydride or halide of an acid of which the acid radical contains a substituent capable of chemically reaching with the fiber to form a chemical bond, or a heterocyclic compound which contains a halogen atom attached to a carbon atom of the heterocyclic nucleus and also a reactive substituent of the kind just stated.

As examples of halides or anhydrides of acids or heterocyclic compounds which may be used, there may be mentioned, for example, carbyl sulphate and the anhydrides or acid halides of α-β-unsaturated aliphatic acids such as chloromaleic anhydride, propiolyl chloride and acryloyl chloride, the acid chlorides of halogenated aliphatic acids such as chloroacetyl chloride, sulphochloroacetyl chloride, β-bromo and β-chloro-propionyl chloride and α:β-dichloro- and -dibromo-propionyl chlorides, 2,2,3,3-tetrafluoro-cyclobutane carbonyl chloride, β-(2,2,3,3-tetrafluorocyclobutyl)acryloyl chloride 2,3,3,-trifluorocyclobut-1-ene carbonyl chloride, β-(2,3,3-trifluorocyclobut-1-enyl)acrylyl chloride, and heterocyclic compounds which contain at least 2 nitrogen atoms in the heterocyclic rings and which contain 2 or more halogen, especially chlorine atoms in the ortho positions to the nitrogen atoms, such as 2:3-dichloro-quinoxaline-5- and -6-carbonyl chlorides, 2:3-dichloroquinoxaline-5- and -6-sulphonyl chlorides, 2:4-dichloro-quinazoline - 6- and 7-sulphonyl chlorides, 2:4:6-trichloroquinazoline-7- and 8-sulphonyl chlorides, 2:4:7- and 2:4:8-trichloroquinazoline-6-sulphonyl chlorides, 2:4-dichloro-quinazoline-6-carbonyl chloride, 1:4-dichloro-phthalazin-6-carbonyl chloride, 2:4-dichloropyrimidine-5-carbonyl chloride, β-(4:5-dichloropyridazonyl-1-)-propionyl chloride, 1-(4'-chloroformylphenyl)- 4:5-dichloro-6-pyridazone, 1-4'-chlorosulphonylphenyl-4:5-dichloro-6-pyridazone, 2:4:6-tribromo- and trichloro-pyrimidines, 2:4:5:6-tetrachloropyrimidine, 5-methyl-2:4:6-trichloropyrimidine, 5-nitro-2:4:6-trichloropyrimidine, 2:4-dichloro-5-nitro-6-methyl-pyrimidine, 2:4-dichloro-5-nitropyrimidine, 2:4:6-trichloro-5-cyanopyrimidine, 5-ethoxycarbonyl-2:4-dichloropyrimidine, 2:4-dichloropyrimidine-5-carbonyl chloride, cyanuric bromide, cyanuric chloride; the primary condensation products of cyanuric bromide or cyanuric chloride with ammonia, an alkali metal sulphite or thiocyanate or an organic mercaptan, hydroxy compound or an organic primary or secondary amine, for example methanol, ethanol, isopropanol, phenol, o-, m- and p-chlorophenols, o-, m- and p-cresols, o-, m-, and p-sulphophenols, thiophenol, thioglycollic acid, dimethyldithiocarbamic acid, mercaptobenzthiazole, thioacetamide, methyl-, dimethyl-, ethyl-, diethyl-, n-propyl, iso-propyl-, butylhexyl- and cylohexylamines, toluidine, piperidine, morpholine, methoxyethylamine, ethanolamine, aminoacetic acid, aniline-2:4-, 2:5- and 3:5-disulphonic acids, orthanilic, metanilic and sulphanilic acids, 2-, 3- and 4- aminobenzoic acids, 4- and 5- sulpho-2-aminobenzoic acids, 4- and 5- sulpho-o-toluidines, 5-amino-2-hydroxybenzoic acid, 2-aminoethanesulphonic acid, amino-naphthalene mono- and disulphonic acids and N-methylaminoethane sulphonic acid; also, the secondary condensation products of cyanuric chloride with alkali metal sulphites, alkali metal thiocyanates, phenols and thiophenols containing an electronegative substituent, and compounds of the formula

(8)

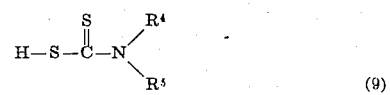

(9)

and

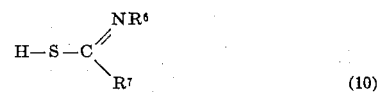

(10)

wherein $Y^1$, $R^5$, $R^6$, $R^7$ and $R^8$ have the meanings stated above.

The cellulose-reactive dyes of formula (1) wherein the cellulose-reactive group is a s-triazine nucleus substituted by a chlorine or bromine atom and an amino or substituted amino group can also be obtained by reacting a celulose-reactive dye of formula (1) containing a dichloro- or dibromo-s-triazine group with ammonia or an amine.

The cellulose-reactive dyes of formula (1) wherein the cellulose-reactive group is a s-triazine nucleus substituted by $SO_3H$, a quaternary ammonium group or a group of formulas 2,3 and 4, can be obtained by reacting a cellulose-reactive dye of formula (1) containing a s-triazine group substituted by at least one chlorine or bromine atom with an alkali metal salt of sulphurous acid, a tertiary amine or a compound of formulas 8, 9 and 10.

Water-insoluble dyes of formula (1) wherein the symbol R represents an aryl or heterocyclic radical free from water-solubilizing groups can be obtained by coupling a compound of formula (5) which is free from water-solubilizing groups with the diazonium compound from an aromatic or heterocyclic amine free from water-solubilizing groups.

As examples of such amines, there may be mentioned more particularly amines which contain a heterocyclic five-membered ring having two or three hetero atoms, preferably one nitrogen and one or two sulphur or oxygen atoms, also optionally substituted anilines especially compounds of the formula:

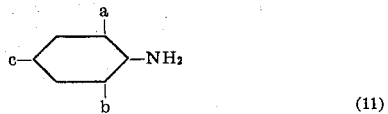

(11)

in which a is H or a halogen atom, an alkyl, alkoxy, nitro, cyano, alkoxy, carbonyl or alkylsulphonyl group, b is H or a halogen atom, an alkyl, cyano or trifluoromethyl group and c is a nitro, cyano, alkoxy carbonyl or alkyl sulphonyl group.

As examples of such amines, there may be mentioned 2-aminothiazole, 2-amino-5-nitrothiazole, 2-amino-5-methylsulphonyl-thiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-amino-indazole, 3-amino-1,2,4-triazole, 5-(methyl,ethyl-,phenyl- and benzyl)-1,2,4-triazoles, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thiocyanatebenzthiazole, 2-amino-6-nitrobenzthiazole, 2-amino-6-ethoxycarbonylbenzthiazole, 2-amino-(4- and 6-)methylsulphonylbenzthiazoles, 2-amino-1,3,4-thiadiazole, 2-amino-1,3,5-thiadiazole, 2-amino-4-phenyl and -4-methyl-1,3,5-thiadiazoles, 2-amino-5-phenyl-1,3,4-thiadiazole, 2-amino-3-nitro-5-methylsulphonyl-thiophene, 2-amino-3,5-bis(methylsulphonyl)-thiophene, 5-amino-3-methyl-isothiazole, 2-amino-4-cyano-pyrazole, 2-(4'-nitrophenyl)-3-amino-4-cyanopyrazole, 3- and 4- aminophthalimides, aniline, p-chloroaniline, p-bromoaniline, p-toluidine, p-nitroaniline, p-cyanoaniline, 2,5-dicyanoaniline, 4-methylsulphonylaniline, 4-aminoethylbenzoate, 2,4-dichloroaniline, 2,4-dibromoaniline, 2-methyl-4-chloroaniline, 2- trifluoromethyl-4 -chloroaniline, 2-cyano-4-chloroaniline, 2-methoxycarbonyl-4-chloroaniline, 2-methoxycarbonyl-4-nitroaniline, 2-chloro-4-cyanoaniline, 2-chloro-4-nitroaniline, 2-bromo-4-nitroaniline, 2-chloro-4-ethoxycarbonylaniline, 2-chloro-4-methylsulphonylaniline, 2-methylsulphonyl-4-chloroaniline, 2,4-dinitro-6-methylsulphonylaniline, 2,4-dinitro-6-(2'-hydroxyethylsulphonyl)aniline, 2,4-dinitro-6-(2'-chloroethylsulphonyl)aniline, 2-methylsulphonyl-4-nitroaniline, 2-methylsulphinyl-4-nitroaniline, 2,4-dinitroaniline, 2,4-dicyanoaniline, 2-cyano-4-methylsulphonylaniline, 2,6-dichloro-4-cyanoaniline, 2,6-dichloro-4-nitroaniline, 2,4-dicyano-6-chloroaniline, 4-aminobenzoic acid-cyclohexylester, 2,4-dinitro-6-chloroaniline, 2-cyano-4-nitroaniline, 1-aminobenzene-2-, -3-, and -4-sulphonamides e.g., the N-methyl-, N,N-dimethyl-, and -diethylamides, N,γ-isopropyloxypropyl-2-aminonaphthalene-6-sulphonamide, aniline- 2-, -3- and -4-sulphon-N,γ-isopropyloxypropyl-amides, aniline-2-, -3- and -4-sulphon-N-isopropylamides, aniline-2-, -3- and -4-sulphon-N,γ-methoxypropyl-amides, aniline-2-, -3- and -4-N,N-bis(β-hydroxyethyl-sulphonamides, 4-chloroaniline-2-sulphonamide, and the substituted derivatives thereof, 2-, 3- and 4-aminophenylsulphamic acids, 2-amino-4-, -5- and -6-methylphenylsulphamic acids, 2-amino-5-methoxy-phenylsulphamic acid, 3-amino-6-chlorophenylsulphamic acid, 3-amino-2,6-dichlorophenysulphamic acid, and 4-amino-2- and -3-methoxyphenylsulphamic acids.

4-Aminoazobenzene compounds which may be used as diazo components include, 4-aminoazobenzene, 3,2'-dimethyl-4-aminoazobenzene, 2-methyl-5-methoxy-4-aminoazobenzene, 4-amino-2-nitroazobenzene, 2,5-dimethoxy-4-aminoazobenzene, 4'-methoxy-4-aminoazobenzene, 2-methyl-4'-methoxy-4-aminoazobenzene, 3,4',6-trimethoxy-4-aminoazobenzene, 4'-chloro-4-aminoazobenzene, 2'- and 3'- chloro-4-aminoazobenzenes, 3-nitro-4-amino-2',4'-dichloroazobenzene and 4-aminoazobenzene-4'-sulphonamide.

Instead of the above, there may be used other diazo components free from water-solubilizing groups which contain a cellulose-reactive group for example, s-triazinyl radicals which contain 1 or 2 chlorine or bromine atoms on the triazine nucleus, pyrimidyl radicals which contain one or two chlorine atoms or one or two arylsulphonyl- or alkanesulphonyl groups on the pyrimidine ring, mono- or bis-(γ-halogeno-β-hydroxypropyl)-amino-groups, β-halogeno-ethylsulhamyl radicals, β-halogenoethoxy groups, β-halogenoethylmercapto groups, 2-chloro-benzthiazolyl-6-azo, 2-chlorobenzthiazolyl-6-amino. γ-halogen-β-hydroxypropylsulphamyl, chloroacetylamino, α, β-dibromopropionyl, vinylsulfonyl and 2,3-epoxypropyl groups.

As examples of such diazo components, there may be mentioned for example N,β-chloroethyl-3-chlor-4-amino-benzenesulphonamide (hydrochloride),N,β-chloroethyl-4-aminobenzenesulphonamide (hydrochloride), 1-bromo-4-amino-ω-chloroacetophenone, N,γ-chloro-β-hydroxypropyl-4-aminobenzene-sulphonamide, N,β-chloroethyl-1-amino-4-naphthylsulphonamide, N,β-chloroethyl-1-amino-3,5-dichloro-benzenesulphonamide and 4-(γ-chloro-β-hydroxy-propoxy)-aniline.

A further class of valuable dyestuffs comprise the metal complex azo dyes containing one-half atom of chromium or cobalt, for each mole of a compound of formula (1) in which R is a benzene radical containing carboxyl or hydroxyl ortho to the azo group, and which may contain other substituents except sulphonic acid in any position or carboxylic acid in positions other than ortho to the azo group.

These dyestuffs can be obtained by coupling a compound of formula (5) with the diazonium salt of an o-hydroxy or o-carboxy amine of the benzene series which is free from $SO_3H$ or other $CO_2H$ groups, and metallizing the resultant azo compound.

As examples of amines which can be used, there may be mentioned o-hydroxy and o-carboxy aniline compounds which may be substituted, e.g., by halogen (e.g., chlorine) alkyl (e.g., methyl), alkoxy (e.g., methoxy), nitro, —CO—alkyl (e.g., —CO—CH$_3$), acylamino-(e.g., acetylamino), sulphonyl (e.g., -SO$_2$—CH$_3$), arylazo and preferably by sulphonamide groups containing a N substituent (e.g., —SO$_2$NH—CH$_3$ or —SO$_2$NH—C$_6$H$_5$). As examples of amines of this kind there may be mentioned: 2-aminophenol, 4-phenylazo-2-aminophenol, 4-methyl-2-aminophenol, 4-methoxy-2-aminophenol, 4-chloro-2-aminophenol, 4- and 5-nitro-2-aminophenols, 4-methoxy-5-chloro-2-aminophenol, 6-acetylamino-4-chloro- and 4-nitro-2-aminophenols, 5- and 6-nitro-4-chloro-2-aminophenols, 6-nitro-4-methyl-2-aminophenol, 3-amino-4-hydroxy-acetophenone, 6-nitro-4-acetylamino-2-aminophenol, 5-nitro-3-amino-4-hydroxy-acetophenone, 2-aminophenol-4-carbonamide, 4,6-dinitro-2-aminophenol, 4,6-dichloro-2-aminophenol, 3,4,6-trichloro-2-aminophenol, 4-nitro-6-chloro-2-aminophenol, 6-nitro-and 6-chloro-2-aminophenol-4-sulphonamides, 4-nitro- and 4-chloro-2-amino-phenol-5- and 6-sulphonamides, 2-aminophenol-4- and -5-sulphonamides and the corresponding -N-methyl-, -N-ethyl-, N-β-hydroxyethyl-, N,γ-methoxy- and -ethoxypropyl-, N-dimethyl-, -N-phenylamides, also the corresponding morpholide and piperidide, as well as the 2-aminophenol-4- and - 5-sulphon-N,3'-sulphonamidophenyl-amides and 3'-sulphamyl-3-amino-4-hydroxy-diphenylsulphone.

As examples of o-carboxyaminobenzene compounds, there may be mentioned 4- and 5-chloro-2-aminobenzoic acids, 4- and 5-nitro-2-aminobenzoic acids and anthranilic acid sulphonamides, e.g., 2-aminobenzoic acid-4- and -5-sulphonamides.

The coupling of the compound of formula 5 with the diazonium compound can be carried out by the usual methods, e.g. in weakly acid or alkaline medium, e.g., containing alkali metal carbonates or hydroxides.

When coupling is complete, the dyestuff can readily be isolated from the coupling mixture by filtration prior to metallization; in some cases it is possible to carry out the metallization directly without isolation from the coupling medium.

The metallization can be carried out by treatment of the azo compound with a chromium- or cobalt-yielding agent, e.g., by treatment in an aqueous medium with a salt of the metal or a chromium or cobalt complex of an aliphatic dicarboxylic or hydroxy-carboxylic acid, e.g., oxalic, lactic, glycollic, citric or tartaric acid, or of an aromatic o-hydroxy carboxylic acid e.g., salicyclic acid. The treatment is preferably carried out hot or under reflux and in some cases is preferably carried out in the presence of organic solubilizing agents e.g., β-ethoxyethanol.

The metallization can be effected of a single azo dyestuff or of a mixture of the dyestuff with a different metallizable dyestuff so as to form, in the latter case, a "mixed" complex of the two dyestuffs. These 'mixed' complexes can alternatively be obtained by first forming a 1:1 complex with one of the dyestuffs and then converting to a 1:2-complex by reaction with the second dyestuff.

A further class of valuable dyestuffs are those which have an externally-bound quaternary N atom and no acid groups which, e.g., can form undesired betaine formation. This quaternary N atom is attached to the radical of the diazo component, especially the radical of an aromatic diazo component of the benzene or naphthalene series or an at most bicyclic heterocyclic diazo component, containing a quaternary amino, hydrazino or etherified hydroxyl-amine group attached to a carbon atom forming part of a ring or of a low molecular weight aliphatic radical.

As examples of such dyes, there may be mentioned the class represented by the formula (1) in which R—N=N— represents a group of the formula:

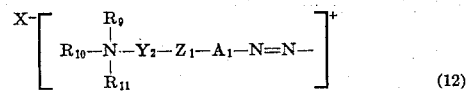
(12)

in which A$_1$ represents a benzene nucleus, Y$_2$—Z$_1$ together represent a direct link or Z$_1$ is a direct link or linking member, e.g., —O—, —NR$^8$—, —CO—, —NR$^8$CO—, or —NR$^8$SO$_2$- where R$^8$ is H or optionally substituted lower alkyl group and Y$_2$ stands for an optionally substituted carbon chain of at most 6 carbon atoms and optionally interrupted by a hetero atom, and which may be joined to R$_9$ and/or R$_{10}$ *to form a cyclic system*, R$_9$ and R$_{10}$ represent H or an alkyl, aralkyl or cycloalkyl radical, R$_{11}$ represents H, alkyl, aralkyl, cycloalkyl, alkoxy, aralkoxy or an amino group, and wherein N, R$_9$ and R$_{10}$ may together form a ring or wherein N, R$_9$, R$_{10}$ and R$_{11}$ may together form one or more rings, and X$^-$ stands for an anion.

These dyes can be obtained by amidation or condensation, coupling or quaternization. For manufacture by amidation or condensation, a dyestuff of formula (1) in which R-N=N represents the group:

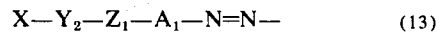

in which A$_1$, Y$_2$ and Z$_1$ have the meanings stated above and X is a substituent which is split off during reaction to form the anion X$^-$is reacted with an amine, hydrazine, or etherified hydroxylamine.

As examples of amines, hydrazines and hydroxylamines which may be reacted with dyestuffs containing a group of Formula (13), there may be mentioned ammonia, methylamine, ethylamine, isopropylamine, methoxyethylamine, methoxypropylamine, dimethylamine, diethylamine, N-methylaniline, N-ethylaniline, chloroethylamine, ethanolamine, diethanolamine, propanolamine, benzylamine, cyclohexylamine, N-methylcyclohexylamine, morpholine, pyrrolidine, piperidine, piperazine, trimethylamine, triethylamine, triethanolamine, dimethylbenzylamine, diethylmethylamine, pyridine, picoline, lutidine, N,N-dimethylcyclohexylamine, N-methylpiperidine, N-methylpiperazine, N-methylmorpholine, quinoline, pyrimidine and 1,4-diazabicyclo(2,2,2)-octane, N-methyl-hydrazine, N,N-dimethylhydrazine, N,N,N'-trimethyl-hydrazine, N,N,N',N'-tetramethylhydrazine, N-aminopiperidine, N-amino-pyrrolidine, 1,5-diazabicyclo-(0,3,3)octane, N-(methoxy)-methylamine, N-(ethoxy)methylethylamine, N-(benzyloxy)dimethylamine, tetrahydroisooxazole, N-methyltetrahydro-1,2-oxazine, N-(cyclohexyloxy)dimethylamine, N(methoxy)-cyclohexylamine, N-(ethoxy)-N-ethyl-β- chloroethylamine and β-(N-methyl-N-methoxy)propionyl chloride.

The reaction of the dyestuff containing a reactive atom or group with the amine, hydrazine on etherified hydroxylamine can conveniently be carried out in a neutral solvent e.g., chlorobenzene, ethanol, aqueous ethanol, aqueous ethanol or dimethylformamide, preferably at an elevated temperature and optionally in the presence of a catalyst, e.g., sodium iodide.

Manufacture by coupling is carried out using a compound of formula (5) as coupling component, and an amine of the formula:

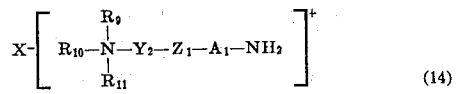
(14)

as diazo component. It is preferred to use a diazo component of the formula:

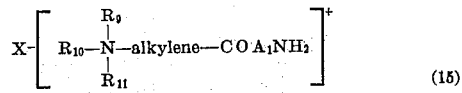
(15)

wherein X, $R_9$, $R_{10}$, $R_{11}$ and A have the meanings stated above. As examples of such compounds, there may be mentioned: 4-amino-α-(N-chloro-N,N,N-trimethyl- and N,N-dimethyl-N-methoxyamino)-acetophenones, 4-amino-α-(N-chloro-N,N,N-triethyl- and N,N-diethyl-N-ethoxyamino)-acetophenones, 4-amino-α-(N-chloro-N-methyl- and -N-methoxy-piperidono-)-acetophenones, 4-amino-3-methyl-α-(N-chloro-N,N,N-triethyl- and N,N-diethyl-N-methoxyamino)-acetophenones, 4-amino-3-methoxy -α-(N-chloro-N,N,N-triethanol- and -N,N-diethanol-N-ethoxyamino)-acetophenones, 4-amino-3-chloro-α-(N-chloro-N,N-dimethylhydrazino)-acetophenones, 4-amino-3-bromo-α-(N-chloro-N,N-diethylhydrazino)-acetophenone, 4-amino-2-chloro-α-(N-chloro-N,N,N'-trimethylhydrazino)-aceto-phenone, 4-amino-2,5-dimethyl-α-(N-chloro-N-aminopiperidino)-acetophenone, 4-amino-β-(N-chloro-N-methoxypiperidino)-propiophenone, 3-amino-α-(N-chloro-N,N-dimethyl-N-dimethyl-N-methoxyamino)-acetophenone, and 4-amino-α-(N-bromo-N-ethyl-N-benzyl-N-methoxyamino)-acetophenone.

These diazo components can be obtained by known methods, e.g., by reaction of acetanilide with chloroacetyl chloride or chloropropionyl chloride, reaction of the resultant product with a tertiary amine, N,N-disubstituted hydrazine, or N,N-disubstituted etherified hydroxylamine and hydrolysis of the acetylamino group.

A further class of suitable diazo components are represented by the formula:

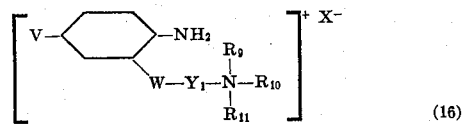
(16)

in which V is a nitro, alkylsulphonyl or an optionally substituted sulphonamide group, W is a divalent radical, e.g., —O— or —S— or a direct bond, and $Y_1$, X, $R_9$, $R_{10}$ and $R_{11}$ have the meanings stated above.

As examples of such diazo components, there may be mentioned: 4-nitro-2-β-(N-chloro-N,N-dimethylhydrazino)ethoxyaniline, 4-methylsulphonyl-2-β-(N-benzyl-N,N-dimethyl-N-methyl-sulphonato)ethoxyaniline: 4-nitro-β-(N-chloro-isoxazolidinium-1-yl)ethoxy aniline, and 4-nitro-2-amino-4'-(N-chloro-N,N,N-trimethyl)aminoacetyldiphenyl ether.

A further class of suitable diazo components are represented by the formula:

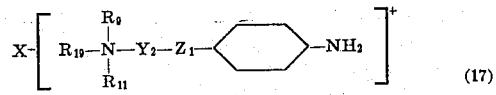
(17)

in which the symbols X, $R_9$, $R_{10}$, $R_{11}$, $Y_2$ and $Z_1$ have the meanings stated above, for example:
4-β-(N-chloro-N,N-dimethyl-N-ethoxyamino)ethyl-sulphamylaniline, and 4-(N-chloro-N,N-dimethyl-N-benzylamino)acetyloxyaniline. Other suitable diazo components are: 2-aminonaphthalene-6-γ-(N,N,N-trimethyl-N-methylsulphonato-amino)propylsulphonamide, 1-amino-4-(N-chloro-N,N,N-trimethylaminoacetyl)naphthalene, 4-amino-4'-(N-chloro-N,N,N-trimethylaminoacetylazobenzene, and 4-(3'-aminophenylaminocarbonyl)-N-chloro-N-methylisoquinoline.

As heterocyclic diazo components, there may be mentioned compounds of the formula:

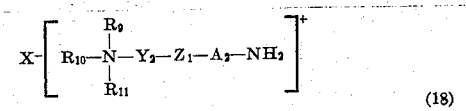
(18)

wherein X, $R_9$, $R_{10}$, $R_{11}$, $Y_2$ and Z have the meanings stated above and A is an aromatic radical containing a 5- or 6- membered heterocyclic ring containing 1 to 3 hetero atoms of which at least one is nitrogen. As examples of such compounds, there may be mentioned: 2-aminobenzthiazole-6-(N-chloro-N,N,N-trimethylamino-propyl)-sulphonamide, 2-aminobenzthiazole-6-carbon-(N-bromo-N,N,N-triethylaminoethyl)-amide, 2-amino-6-(N-methyl-sulphonato-N,N,N-trimethyl-aminomethyl)benzthiazole, 5-amino-3-(4'-N-chloro-N,N,N-trimethylamino-methyl)phenyl-1,2,4-thiadiazole, 2-amino-5-(B-bromo-N,N,N-trimethylamino)methyl-1,3,4-thiadiazole, and 2-amino-5-(4'-N-chloro-N,N,N-trimethylaminomethyl)phenyl-1,3,4-thiadiazole.

The diazotization of the above diazo components can be carried out, e.g., by treatment with a mineral acid, especially hydrochloric acid and sodium nitrite, or, e.g., with a solution of nitrosyl sulphuric acid in concentrated sulphuric acid.

Coupling can be carried out in neutral or slightly acid solution, if necessary in the presence of sodium acetate or similar buffers or catalysts e.g., pyridine.

Manufacture by quanternization may be effected by treating a dye of formula (1) in which R — N = N— represents a group of the formula:

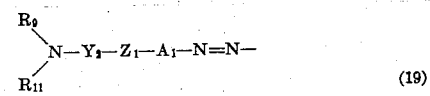
(19)

with a compound of the formula:

$R_{10}—X$

As examples of compounds of formula $R_{10}—X$ there may be mentioned, for example, esters of strong mineral acids or organic sulphonic acids, e.g., dimethylsulphate, diethylsulphate, alkyl halides e.g., methyl chloride, methylbromide and methyl iodide, aralkyl halides, e.g., benzyl chloride, esters of low molecular weight alkanesulphonic acids, e.g., methyl esters of methane-, ethane- and butane-sulphonic acids, and esters of benzene sulphonic acids and their nuclear-substituted derivatives, e.g., the methyl, ethyl, propyl and butyl esters of benzene sulphonic acid, of 2- and 4- toluene sulphonic acids, 4-chlorobenzene sulphonic acid and 3- and 4- nitrobenzene sulphonic acids.

Dyes containing a group of formula (19) may be obtained by coupling a compound of formula 5 with the diazonium salt of an amine of the formula:

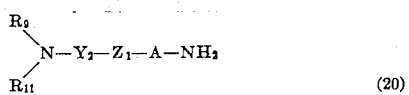
(20)

wherein $R_9$, $R_{11}$, $Y_2$, $Z_1$ and $A_1$ have the meanings stated above. A preferred class of amines of this formula are represented by the formula:

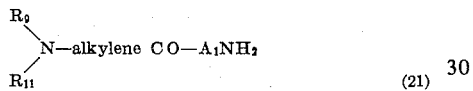
(21)

As examples of such amines there may be mentioned 4-amino-α-amino-acetophenone, 4-amino-3-methyl-, methoxy- and -chloro-α-amino-acetophenones, 4-amino-2,5-dimethyl-β-amino-propiophenone, also compounds in which the aminoacetyl radical is mono- or dialkylated or aralkylated, e.g., 4-amino-α-N-metnylaminoacetophenone, 4-amino-α-N-cyclohexylaminoacetophenone, 4-amino-3-methyl-β-N,N-diethylaminopropiophenone, 4-amino-α-N-methoxy-aminoacetophenone, 4-amino-3-chloro-α-N-ethyl-N-ethoxy-amino-acetophenone, 4-amino-2-chloro-α-hydrazino-acetophenone, 4-amino-2-chloro-α-N-methylhydrazinoacetophenone and 3-amino-β-N-ethylhydrazinpropio-phenone.

These diazo components can be obtained by known methods, e.g., by reaction of acetanilide with chloro acetyl chloride or chloropropionyl chloride, reaction of the resultant product with a primary or secondary amine, hydrazine or N-substituted hydrazine or an etherified hydroxylamine or N-substituted hydroxylamine, followed by hydrolysis of the acetylamide group.

A further class of suitable diazo components are amines represented by the formula:

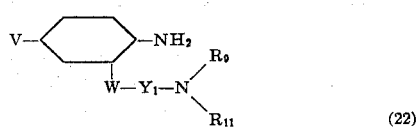
(22)

in which V, W, $Y_1$, $R_9$ and $R_{11}$ have the meanings stated above. As examples of such amines there may be mentioned: 4-nitro-2-(β-N-methylhydrazinoethoxy)aniline, 4-methanesulphonyl-2f0-(β-benzylaminoethoxy)aniline, 4-nitro-2-(β-tetrahydroisoxazol-N-ylethoxy)aniline, and 4-nitro-2-(p-dimethylaminoacetophenoxy) aniline.

A further class of suitable diazo components are amines represented by the formula:

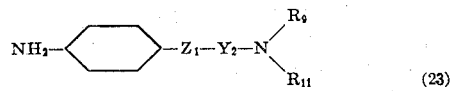
(23)

wherein $Z_1$, $Y_2$, $R_9$ and $R_{11}$ have the meanings stated above. As examples of such amines, there may be mentioned:
p-aminobenzyldimethylamine,
p-aminobenzyl-N-methyl hydrazine,
p-β-dimethylaminoethylsulphonyl aniline,
p-β-(N-ethyl-N-ethoxyamino)ethylsulphamyl aniline,
p-amino-β-(N-methylhydrazine)ethyl benzoate,
p-aminophenyl-dimethylaminoacetate, and
4-amino-4'-dimethylaminoacetyl diphenyl.

Other suitable diazo components are: 2-amino-6-γ-dimethylaminopropylsulphamyl naphthalene,
1-amino-4-dimethylaminoacetyl naphthalene,
4-amino-4'-dimethylaminomethylazobenzene,
4-amino-4'-dimethylaminoacetylazobenzene, and
β-picolinoyl-m-phenylene diamine.

As heterocyclic diazo components, there are preferred amines of the formula:

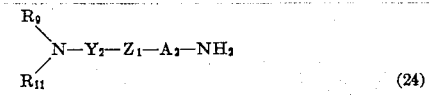
(24)

wherein $R_9$, $R_{11}$, $Y_2$, $Z_1$ and $A_2$ have the meanings stated above. As examples of such amines, there may be mentioned:
2-aminobenzthiazole-6-(N,N-dimethylaminopropyl)sulphonamide,
2-amino-6-β-(dimethylamino)ethoxycarbonylbenz thiazole,
2-aminobenzthiazole-6-carbon-N,N-diethylaminoethylamide,
2-amino-6-diethylaminoethylthiobenzthiazole,
2-amino-6-diethylaminoethoxybenzthiazole,
2-amino-6-N,N-dimethylaminomethylbenzthiazole,
2-amino-5-morpholinomethylthiazole,
2-amino-5- piperidinomethylthiazole,
2-amino-4-(4'-dimethylaminomethyl)phenylthiazole,
5-amino-3-(4'-N,N-dimethylaminomethyl)phenyl-1,2,4-thiadazole,
2-amino-5-(4'-N,N,-dimethylaminomethyl)phenyl-1,3,4-thiadiazole,
3-aminopyridine,
3-amino-1-(4'-dimethylaminomethyl)phenylpyrazole,
3-amino-6-(dimethylamino)methylindazole, and 3-amino-1,2,4-triazole.

Diazothization of the above diazo components can be carried out, e.g., by treatment with a mineral acid, especially HCl, and sodium nitrite or e.g., with a solution of nitrosyl sulphuric acid in concentrated sulphuric acid. Coupling can be carried out in neutral or slightly acid solution, if necessary in the presence of sodium acetate or similar buffers or caralysts e.g., pyridine.

The alkylation of the azo dye with the compound of formula $R_{10}—X$ can be effected by heating the reactants in an inert organic solvent, e.g., hydrocarbons, e.g., benzene, toluene and xylene; halogenated hydrocarbons, e.g., carbon tetrachloride, tetrachloroethane, chlorobenzene and o-dichlorobenzene, nitro-hydrocarbons, e.g., nitromethane, nitrobenzene and nitronaphthalene; acid anhydrides, amides and nitriles e.g., acetic anhydride, dimethylformamide, acetonitrile and dimethyl sulphoxide. Instead of an inert organic solvent, a large excess of the alkylating agent can be used, but care must be taken not to overheat the mixture since an exothermic reaction usually takes place. In some cases the alkylation can be carried out in aqueous medium, or in the presence of an alcohol, optionally aided by a small amount of potassium iodide.

The new dyestuffs containing acid solubilizing groups can be used for dyeing and printing a wide variety of material e.g., silk, wool, superpolyamides, polyhydroxylic materials of fibrous structure, e.g., regenerated cellulose e.g., viscose rayons and natural cellulose, e.g., cotton and linen. Many of the dyestuffs are suitable for dyeing nitrogen-containing materials, especially wool, from an acid bath.

The new dyestuffs containing sulphonic acid groups and a fiber-reactive group are valuable for the dyeing and printing of cellulose, polyamide and wool textile materials with which they react in the presence of alkali and, if necessary, the action of heat.

The new dyestuffs which are free from complex metal groups and sulphonic acid groups may be used as disperse dyestuffs in the presence of dispersing agents, e.g., sulphited cellulose or synthetic surface-active agents or a combinations of wetting and dispersing agents. For this purpose, a dyestuff preparation is used containing a dispersing agent and the dyestuff in a finely-divided state. These dyestuff preparations can be obtained in the usual way, e.g., by milling the dyestuff in the presence of the dispersing agent, and used for the dyeing of cellulose acetate and polyethylene terephthalate by conventional processes e.g., by dyeing at 100° C. or over or in the presence of a carrier e.g., salicyclic acid, phenol, o or p-hydroxydiphenyl, or by a thermofixation process in which the fabric is padded through a dispersion of the dyestuff and given a short treatment at a temperature of 180°–210° C. or possibly higher.

The chromium and cobalt-complex dyestuffs which are free from sulphonic and carboxylic acid groups are dispersible in water and weakly acid dyebaths and can be used for the dyeing and printing of animal fibers, e.g., silk, leather and especially wool, and some synthetic materials e.g., superpolyamides and superpolyurethanes, and polypropylene. For this purpose they may be applied from slightly acid, neutral or slightly alkaline baths, especially an acetic acid bath.

The dyestuffs containing a quaternary ammonium group contain an anion of a strong acid e.g., sulphuric acid or its half ester, or an arylsulphonic acid or a chloride ion. This anion can be replaced by the anion of a different acid, e.g., phosphoric acid or an organic acid, e.g., formic, lactic or tartaric acid. In certain cases, the free base can be obtained. The salts can be converted to their double salts with e.g., the halides of elements of the second group of the Periodic Table especially zinc chloride or cadmium chloride.

The dyestuffs containing a quaternary ammonium group can be used for the dyeing or printing of many synthetic fibers, e.g., polyvinyl chloride, polyamides, polyurethanes, polyethylene terephthalates, and especially polyacrylonitrile and polyvinylidene cyanide fibers. In "polyacrylonitrile" fibers are included a range of polymers containing more than 80 percent e.g., 80–95 percent of acrylonitrile, the remaining 5–20 percent can be e.g., vinylacetate, vinylpyridine, vinyl chloride, vinylidene chloride, acrylic acid, acrylic acid esters, methacrylic acid or methacrylic acid esters. These dyestuffs are usually slightly electrolyte sensitive and exhibit in part a decidedly good solubility in water or polarized solvents. Dyeing may be carried out in aqueous neutral or slightly acid media, preferably at the boiling point under atmospheric pressure or at a higher temperature and higher pressure.

The invention is illustrated but not limited by the following Examples in which parts are by weight and the ratio w/v is in the ratio of grams to c.c.:

Example 1

3.83 parts of 2-naphthylamine-3,6,8-trisulphonic acid are dissolved in 50 parts of water by the dropwise addition of 2N sodium hydroxide solution. Five parts of 2N sodium nitrite solution are added and the solution is cooled to 0–5° C. and three parts of concentrated hydrochloric acid (36°Tw) are added. The suspension is stirred for ½ hour, then the slight excess of nitrous acid is removed by the addition of 10 percent sulphamic acid solution.

2.1 parts of 3-acetylamino-1-ethyl-6-hydroxy-4-methylpyrid-2-one are dissolved in 50 parts of water by addition of 2N sodium carbonate solution. The suspension of diazonium salt is then added and the pH of the mixture is adjusted to 5–6 by addition of 2N sodium carbonate solution. The clear solution is stirred at 0–5° C. for 1½ hours and then heated to 100° C. 30 Parts of concentrated hydrochloric acid (36°Tw) are added and the mixture is heated under reflux for one-half hour. The solution is salted to 20 percent w/v sodium chloride, cooled to 10° C. and the precipitate collected by filtration. It is washed with 30 parts of a 10 percent brine solution and then dissolved in 150 parts of water by addition of 2N sodium carbonate solution, the final pH of the solution being 6.5. This solution is cooled to 0–5° C. and then added during 15 minutes to a stirred suspension of two parts of cyanuric chloride in 20 parts of acetone, 50 parts of ice, 50 parts of water and one part of a wetting agent. The mixture is stirred at 0–5° C. for one-half hour, the pH being maintained between 6–7 by the occasional addition of 2N sodium carbonate solution. The solution is filtered and then a solution of five parts of potassium dihydrogen phosphate and 2.5 parts of disodium hyrodgen phosphate in 25 parts of water is added. The solution is salted to 25 percent w/v with potassium chloride, stirred at 0–5° C. for 2 hours, and the precipitated dyestuff collected by filtration. The paste is intimately mixed with 0.8 parts of potassium dihydrogen phosphate and 0.4 parts of disodium hydrogen phosphate and dried in vacuo at room temperature. Upon analysis it is found to contain 2.2 moles of reactive chlorine per mole of dyestuff and, when applied to cellulosic fibers in conjunction with an acid binding agent, to dye the fiber a bright greenish yellow shade of excellent fastness to washing and light. The 3-acetylamino-1-ethyl-6-hydroxy-4-methylpyrid-2-one used in the above Example may be obtained as follows: 31 Parts of 1-ethyl-6-hydroxy-4-methylpyrid-2-one are dissolved in a mixture of 200 parts of water, 110 parts of 2N sodium hydroxide and 105 parts of 2N sodium nitrite solution. The solution is cooled to 0–5° C. and added to a mixture of 500 parts of 2N hydrochloric acid and and 200 parts of ice, at such a rate that the temperature of the mixture does not rise above 10° C. The precipitate of 1-ethyl-6-hydroxy-4-methyl-3-nitrosopyrid-2-one which is formed is filtered off, washed with 3 × 100 parts of water, and dried. This product is suspended in a mixture of 350 parts of acetic acid and 65 parts of acetic anhydride. 18 parts of a catalyst consisting of 3 percent palladium on charcoal, pasted with an equal weight of water, are added and the mixture is shaken at room temperature and atmospheric pressure in an atmosphere of hydrogen until the rapid uptake of hydrogen has ceased. The mixture is filtered and the filtrate evaporated to dryness. The residue is triturated with water and the colorless product collected by filtration, washed with 3 × 100 parts of water and dried. Upon analysis it is found to contain C = 57.0, H = 6.6, N = 13.2 percent $M^W$ 210 ($C_{10}H_{143}N_2$ requires C = 57.1, H = 6.7, N = 13.3 percent MW 210).

Example 2

9.7 parts of 1,3-phenylenediamine-4,6-disulphonic acid are dissolved in 100 parts of water by addition of 2N sodium carbonate solution, the pH of the solution finally being 4.5. This solution is cooled to 0–5° C. and rapidly added to a stirred suspension of 6.2 parts of cyanuric chloride in 25 parts of acetone, 60 parts of ice, 60 parts of water and one part of a wetting agent. The mixture is stirred at 0–5° C. for 1½ hours, the pH being maintained between 4–5 by the occasional addition of 2N sodium carbonate solution. 8 Parts of concentrated hydrochloric acid (36°Tw) are added and then a slight excess of 2N sodium nitrite solution. The excess nitrous acid solution is then decomposed by adding 10 percent aqueous solution of sulphamic acid.

7.0 parts of 3-acetylamino-1-ethyl-6-hydroxy-4-methylpyrid-2-one are dissolved in 100 parts of water by addition of 2N sodium carbonate solution until the pH is 8. The suspension of the diazonium salt is then added and the pH of the mixture adjusted to 5–6 with 2N sodium carbonate solution. The mixture is stirred at 0–5° C. for 1 hour, filtered, and 11 parts of ammonia solution (d 0.880) added. The mixture is stirred at 30–35° C. for one-half hour and then concentrated hydrochloric acid is added dropwise until the pH is at 6–7. The dyestuff is precipitated by the addition of 10 percent w/v sodium chloride and collected by filtration. It is washed with 50 parts of 10 percent brine solution and dried in vacuo at 40° C.

Upon analysis the dyestuff is found to contain 1.1 moles of hydrolysable chlorine per mole of dyestuff and, when applied to cellulosic fibers in conjunction with an acid-binding agent, to dye the fiber a bright greenish-yellow shade which is fast to washing and light.

EXAMPLE 3

6.7 Parts of 2-amino-6-nitrophenol-4-sulphonic acid are stirred with 8 parts of concentrated hydrochloric acid and 250 parts of water at 0–5° C. A 2N solution of sodium nitrite is added dropwise until there is a faint permanent excess. The excess of nitrous acid is destroyed with 10 percent aqueous solution of sulphamic acid.

7.0 parts of 3-acetylamino-1-ethyl-6-hydroxy-4methylpyrid-2-one are dissolved in 150 parts of water at pH 8 and the diazonium salt suspension is added. The pH of the mixture is adjusted to 4–5 and stirred at 0–5° C. for 1½ hours. The solution is filtered and the filtrate is salted to 25 percent w/v solution chloride. After stirring at 0–5° C. for 3 hours the precipitate is collected by filtration, washed with 50 parts of 25 percent brine solution containing a few drops of 2N hydrochloric acid. The filter cake is then stirred under reflux for one-half hour with 500 parts of water and 100 parts of concentrated hydrochloric acid (36°Tw). The mixture is cooled, salted to 10 percent w/v sodium chloride and the precipitate collected by filtration. The filter cake is stirred with 400 parts of water and the pH adjusted to 6–7 with 2N sodium carbonate solution. Eight parts of chromium acetate are added and the solution is stirred under reflux for 3 hours. The solution is cooled and salted to 20 percent w/v sodium chloride. The bluish red precipitate is collected by filtration, redissolved in 200 parts of water at pH 6–7 and the solution is cooled to 0–5° C. This solution is added during 10 minutes to a stirred suspension of 6.6 parts of cyanuric chloride in 25 parts of acetone, 60 parts of ice, 60 parts of water and one part of wetting agent. The mixture is stirred at 0–5° C. for one-half hour, the pH being maintained between 6–7 by the occasional addition of 2N sodium carbonate solution. A solution of 6.4 parts of metanilic acid in 100 parts of water at pH 6–7 is added and the mixture is stirred at 30–35° C., pH 6–7 for one-half hour. The dyestuff is precipitated by salting to 30 percent w/v potassium chloride, collected by filtration, and dried in vacuo at 40° C.

Upon analysis the dyestuff is found to contain 2.0 moles of hydrolysable chlorine per mole of dyestuff and, when applied to cellulosic fibers in the presence of an acid-binding agent, is found to dye the fiber in rubine shades fast to light and washing.

Example 4

4.5 parts of 1-ethyl-6-hydroxy-4-methyl-3-nitrosopyrid-2-one, two parts of sodium hydroxide and 2 parts of a catalyst consisting of 3 percent palladium on charcoal (which has previously been pasted with an equal weight of water) are added to 100 parts of water. The mixture is shaken at room temperature and atmospheric pressure in an atmosphere of hydrogen until the uptake of hydrogen has ceased. The hydrogen is replaced by an atmosphere of nitrogen and the mixture filtered, taking care to exclude air. The clear filtrate is stirred at 30–35° under an atmosphere of nitrogen and the pH of the solution is reduced to 9–10 by the addition of solid carbon dioxide.

A solution of 4.3 parts of metanilic acid in 50 parts of water at 0–5° C, pH 6–7 is added dropwise during one-half hour to a stirred suspension of cyanuric chloride prepared by adding a solution of five parts of cyanuric chloride in 15 parts of acetone to a stirred mixture of 30 parts of ice, 30 parts of water and one-half part of wetting agent. The pH of the mixture during the course of addition is maintained at 6–7 by adding 2N sodium carbonate solution as necessary. The mixture is screened and the clear filtrate is added dropwise during 1 hour to the stirred solution described in the first paragraph, the pH of the mixture being maintained at 9–9.5 by occasional addition of 2N sodium carbonate solution. The pH is reduced to 6–7 by the dropwise addition of hydrochloric acid (36°Tw) and the solution cooled to 0–5°.

4.3 parts of orthanilic acid are dissolved in 100 parts of water by the dropwise addition of caustic liquor (70°Tw). 12.5 parts of 2N sodium nitrite solution are added and the solution cooled to 0–5° C and stirred vigorously while five parts of hydrochloric acid (36°Tw) are added. The mixture is stirred vigorously at 0–5° for one-half hour, the excess nitrous acid decomposed by the addition of a few drops of a 10 percent aqueous solution of sulphamic acid and the suspension added to the stirred solution of 1-ethyl-4-methyl-3-[4'-(3''-sulphophenylamino)-6'-chloro-s-triazin-2'-ylamino]-6-hydroxypyrid-2-one described in the second paragraph. The pH of the mixture is adjusted to 5–6 and the mixture stirred at 0–5° C. for 1 hour. The dyestuff is precipitated by salting to 25 percent w/v potassium chloride and is collected by filtration, washed with 20 percent potassium chloride solution and dried in vacuo at 40° C.

Upon analysis the dyestuff is found to contain 1.18 moles of hydrolysable chlorine per mole of dyestuff and, when applied to cellulose in conjunction with an acid-binding agent, is found to dye the fiber a bright greenish-yellow shade of excellent fastness to washing and light.

Example 5

4.5 parts of 1-ethyl-6-hydroxy-4-methyl-3-nitrosopyrid-2-one, two parts of sodium hydroxide, and two parts of a catalyst consisting of 3 percent palladium on charcoal (which has previously been pasted with an equal weight of water) are added to 100 parts of water. The mixture is shaken at room temperature and atmospheric pressure in an atmosphere of hydrogen until the uptake of hydrogen has ceased. The hydrogen is replaced by an atmosphere of nitrogen and the mixture screened, taking care to exclude air. The clear filtrate is stirred at 0–5° under an atmosphere of nitrogen.

7.6 parts of 2-aminonaphthalene-1,5-disulphonic acid are dissolved in 150 parts of water by the dropwise addition of caustic liquor (70°Tw). 12.5 parts of 2N sodium nitrite solution are added and the solution stirred at 0–5° while eight parts of concentrated hydrochloric acid (36°Tw) are added. After stirring one-half hour at 0–5°, the excess nitrous acid is decomposed with 10 percent sulphamic acid and the suspension added to the stirred solution of 3-amino-1-ethyl-6-hydroxy-4-methyl-pyrid-2-one described in the first paragraph. The pH is adjusted to 6–7 and the mixture stirred at 0–5° for 2 hours. One part of calsolene oil is then added.

A solution of five parts of cyanuric chloride in 20 parts of acetone is added and the mixture stirred at 0–5° for 3 hours, the pH being maintained at 6–7 by occasional addition of 2N sodium carbonate solution. A further 2 parts of cyanuric chloride in 10 parts of

| Example | Diazo component | Coupling component | Acylating agent | Shade on cellulose |
|---|---|---|---|---|
| 6 | Aniline-2,5-disulphonic acid | 3-acetylamino-1,4-dimethyl-6-hydroxypyrid-2-one. | 2,4-dichloro-6-m-sulphonilino-s-triazine | Greenish-yellow. |
| 7 | do | do | 2,4-dichloro-6-amino-s-triazine | Do. |
| 8 | Metanilic acid | 3-acetylamino-6-hydroxy-4-methyl-1-phenylpyrid-2-one. | 2,4-dichloro-6-N-ω-sulphomethyl-anilino-s-triazine. | Do. |
| 9 | 2-aminonaphthalene-4,8-disulphonic acid. | 3-acetylamino-1-benzyl-6-hydroxy-4-methylpyrid-2-one. | 4,5-dichloro-6-methyl-2-methyl-sulphonylpyrimidine. | Yellow. |
| 10 | 4-amino-4'-nitrostilbene-2,2'-disulphonic acid. | 3-acetylamino-1-n-butyl-6-hydroxy-4-methylpyrid-2-one. | 2,3-dichloroquinoxaline-6-carbonyl chloride. | Do. |
| 11 | 6-acetylamino-2-aminonaphthalene-4,8-disulphonic acid. | 3-acetylamino-1-o-chlorophenyl-6-hydroxy-4-methylpyrid-2-one. | 2,4-dichloro-6-(2',5'-disulphoanilino)-s-triazine. | Reddish-yellow. |
| 12 | 4-aminoanisole-3-sulphonic acid | 3-acetylamino-6-hydroxy-4-methyl-1-o-tolylpyrid-2-one. | do | Do. |
| 13 | Orthanilic acid | 3-acetylamino-1-ethyl-6-hydroxy-4-methylpyrid-2-one. | do | Greenish-yellow. |
| 14 | Aniline-2,4-disulphonic acid | do | 2,3,5,6-tetrachloropyrimidine | Do. |
| 15 | 2-aminonaphthalene-3,6,8-trisulphonic acid. | do | β-(4,5-dichloropyridaz-3-onyl)-1-propionyl chloride. | Yellow. |
| 16 | do | do | β-Phenylsulphonyl propionyl chloride | Do. |
| 17 | do | do | Acryloyl chloride | Do. |
| 18 | do | do | 3,6-dichloropyridazine-4-carbonyl chloride. | Do. |
| 19 | do | do | 2,4,6-trichloropyrimidine | Do. |
| 20 | do | do | 5-bromo-2,4,5-trichloropyrimidine | Do. |
| 21 | do | do | 5-cyano-2,4,5-trichloropyrimidine | Do. |
| 22 | do | do | 2,4-dichloropyrimidine-5-carbonyl chloride. | Do. |
| 23 | do | do | 2,4-dichloropyrimidine-5-sulphonyl chloride. | Do. |
| 24 | do | do | 2-chlorobenzthiazole-6-carbonyl chloride. | Do. |
| 25 | do | do | 1,4-dichlorophthalazine-6-carbonyl chloride. | Do. |
| 26 | do | do | β-Bromopropionyl chloride | Do. |
| 27 | do | do | Tetrafluorocyclobutane carbonyl chloride. | Do. |
| 28 | do | do | Trifluorocyclobutene carbonyl chloride. | Do. |
| 29 | do | do | β-(Tetrafluorocyclobutyl) acryloyl chloride. | Do. |
| 30 | do | do | β-(Trifluorocyclobutyl) acryloyl chloride. | Do. |
| 31 | do | do | 2,4-dichloro-6-methoxy-s-triazine | Do. |
| 32 | do | do | 2,4-dichloro-6-(5'-sulphonaphthyl-2'-amino)-s-triazine. | Do. |
| 33 | do | do | Carbyl sulphate | Do. |
| 34 | 5-acetylamino-1-aminobenzene-2-sulphonic acid. | do | 2,4-dichloro-6-(2',5'-disulphoaniline)-s-triazine (2 moles). | Greenish-yellow. |
| 35 | 4-acetylamino-1-aminobenzene-2-sulphonic acid. | do | do | Reddish-yellow. |
| 36 | 4-acetylamino-1-aminobenzene-2,5-disulphonic acid. | do | do | Do. |
| 37 | 4'-acetylamino-4-aminostilbene-2,2'-disulphonic acid. | do | do | Orange. |
| 38 | do | do | 2,4-dichloro-6-(m-sulphoanilino)-s-triazine. | Do. | acetone are added and the mixture stirred for a further 2 hours at 0–5°, pH 6–7. The mixture is screened and a solution of five parts of potassium dihydrogen phosphate and 2.5 parts of disodium hydrogen phosphate in 25 parts of water is added to the clear filtrate. The dyestuff is precipitated by salting to 30 percent w/v with potassium chloride, collected by filtration and washed with saturated potassium chloride solution. The filter cake is intimately mixed with one part of potassium dihydrogen phosphate and 0.5 parts of disodium hydrogen phosphate and dried in vacuo at room temperature. Upon analysis it is found to contain 1.92 moles of reactive chlorine per mole of dyestuff and, when applied to cellulosic fiber in conjunction with an acid-binding agent, dyes the fiber a bright greenish-yellow shade of excellent fastness to washing and light.

The following table depicts further examples of the invention obtained in similar manner to Example 1 by diazotizing the diazo component described in column 2 and coupling with the coupling component described in column 3, hydrolyzing the product so obtained and then condensing with the compound described in column 4. The shade of the dyestuff (on cellulose) so obtained is described in column 5.

The following Table depicts further examples of the invention obtained in similar manner to Example 2 by condensing the diamine described in column 2 with one molecular proportion of the compound described in column 3, then diazotizing the product so obtained and coupling with the coupling component described in column 4. The shade on cellulose of the dyestuff so obtained is described in column 5.

Further examples of the invention are illustrated in the following Table, being obtained by diazotizing the diazo component described in column 2 and coupling with the coupling component described in column 3, hydrolyzing the product then forming the metal complex (the symmetrical 2:1 complex in the case of chromium and cobalt and the 1:1 complex in the case of copper or nickel). Finally, the metallized azo compound is then condensed with the acylating agent indicated in column 5.

Further examples of the invention are illustrated in the following Table, being obtained by acylating the aminopyridone described in column 2 with the acylating agent described in column 3 and then coupling the product so obtained with the diazo component described in column 4.

| Example | Diamine | Acylating agent | Coupling component | Shade on cellulose |
|---|---|---|---|---|
| 39 | 1,3-diaminobenzene-4-sulphonic acid | 2,4-dichloro-6-(1',5'-disulphonaphthyl-2'-amino)-s-triazine. | 3-benzoylamino-1-ethyl-6-hydroxy-4-methylpyrid-2-one. | Greenish-yellow. |
| 40 | 1,4-diaminobenzene-2-sulphonic acid | 2,4-dichloro-6-(3',6',8'-trisulphonaphthyl-1'-amino)-s-triazine. | 1-ethyl-6-hydroxy-4-methyl-3-phthalimidopyrid-2-one. | Reddish-yellow. |
| 41 | 1,4-diaminobenzene-2,5-disulphonic acid | Cyanuric chloride | 1-ethyl-6-hydroxy-4-methyl-3-p-toluenesulphonylaminopyrid-2-one. | Do. |
| 42 | 1,3-diaminobenzene-4,6-disulphonic acid | 2,4-dichloro-6-p-sulphoanilino-s-triazine. | 1-isopropyl-6-hydroxy-4-methyl-3-p-nitrobenzoylaminopyrid-2-one. | Do. |
| 43 | do | do | 1-isobutyl-6-hydroxy-4-methyl-3-p-nitrobenzenesulphonylaminopyrid-2-one. | Do. |
| 44 | do | do | 3-n-butyrylamino-1,4-dimethyl-6-hydroxypyrid-2-one. | Do. |

| Example | Diazo component | Coupling component | Metal | Acylating agent | Shade on cellulose |
|---|---|---|---|---|---|
| 45 | 2-amino-6-nitrophenol-4-sulphonic acid | 3-acetylamino-1-ethyl-6-hydroxy-4-methylpyrid-2-one. | Co | 2,4-dichloro-6-m-sulphoanilino-s-triazine. | Rubine. |
| 46 | do | do | Cu | do | Orange-brown. |
| 47 | do | do | Ni | do | Do. |
| 48 | 2-aminophenol-4,6-disulphonic acid | do | Cr | do | Do. |
| 49 | 2-aminophenol-4-sulphonic acid | do | Co | do | Red. |
| 50 | 2-amino-6-chlorophenol-sulphonic acid | do | Cu | do | Rubine. Orange-brown. |
| 51 | 1-amino-2-hydroxynaphthalene-4-sulphonic acid. | do | Cr | do | Rubine. |
| 52 | 1-amino-2-hydroxy-6-nitronaphthalene-4-sulphonic acid. | do | Cr | do | Do. |

| Example | | Acylating agent | Diazo component | Shade on cellulose |
|---|---|---|---|---|
| 53 | 3-amino-1-ethyl-6-hydroxy-4-methyl pyrid-2-one. | 2-m-sulphoanilino-4,6-dichloro-s-triazine. | m-β-Sulphatoethyl sulphonyl aniline | Greenish-yellow. |
| 54 | do | do | p-β-Sulphatoethyl sulphonyl aniline | Do. |
| 55 | do | do | 2-methoxy-5-β-sulphatoethyl sulphonyl aniline. | Yellow. |
| 56 | do | do | 2-amino-5-β-sulphatoethyl sulphonyl-1-sulphonaphthalene. | Greenish-yellow. |
| 57 | 3-amino-1,4-dimethyl-6-cyhroxypyrid-2-one. | do | 2-aminonaphthalene-1,5-disulphonic acid. | Do. |
| 58 | do | do | 2-aminonaphthalene-1,5,7-trisulphonic acid. | Do. |
| 59 | do | 2-(2',5'-disulphoanilino)-4,6-dichloro-s-triazine. | 2-aminonapthalene-1-sulphonic acid | Do. |
| 60 | do | do | 2-methoxy-4-(2',5'-disulphophenylazo)-5-methylaniline. | Rubine. |

Example 61

6.7 Parts of 2-amino-6-nitrophenol-4-sulphonic acid are stirred with eight parts of concentrated hydrochloric acid and 250 parts of water at 0–5° C. A 2N solution of sodium nitrite is added dropwise until there is a faint permanent excess. The excess nitrous acid is destroyed with a 10 percent aqueous solution of sulphamic acid.

is refiltered, dried in vacuo at 40° and, upon estimation, is found to contain 2.3 moles of hydrolysable chlorine per mole of dyestuff. When applied to cellulosic fibers in the presence of an acid binder it dyes the fabric an attractive bluish-red color.

The following table describes a number of other Examples obtained in a similar manner.

| Example | Diazo component | Coupling component | Triazine compound | Shade |
|---|---|---|---|---|
| 62 | 2-aminophenol-4,6-disulphonic acid | 3-acetylamino-1-,4-dimethyl-6-hydroxy-pyrid-2-one. | 2,4-dichloro-6-m-sulphoanilino-s-triazine. | Brownish-red. |
| 63 | 2-aminophenol-4-sulphonic acid | 3-acetylamino-1-n-butyl-6-hydroxy-4-methylpyrid-2-one. | do | Do. |
| 64 | 2-amino-4-nitrophenol-4-sulphonic acid | 3-acetylamino-1-n-propyl-6-hydroxy-4-methylpyrid-2-one. | do | Do. |
| 65 | 6-chloro-2-aminophenol-4-sulphonic acid | 3-acetylamino-1-ethyl-6-hydroxy-4-methylpyrid-2-one. | do | Do. |
| 66 | 1-amino-2-hydroxynaphthalene-4-sulphonic acid. | do | do | Rubine. |
| 67 | 1-amino-2-hydroxy-6-nitronaphthalene-4-sulphonic acid. | do | do | Do. |

7.0 parts of 3-acetylamino-1-ethyl-6-hydroxy-4-methylpyrid-2-one are dissolved in 150 parts of water at pH 8 and the diazonium salt suspension is added. The pH of the mixture is adjusted to 4–5 and stirred at 0–5° C for 1½ hours. The solution is screened and the filtrate is salted to 25 percent w/v sodium chloride. After stirring at 0–5° C for 3 hours the precipitate is collected by filtration and washed with 50 parts of 25 percent brine solution containing a few drops of 2N hydrochloric acid. The filter cake is then stirred under reflux for one-half hour with 500 parts of water and 100 parts of concentrated hydrochloric acid (36°Tw). The mixture is cooled, salted to 10 percent w/v sodium chloride and the precipitate collected by filtration.

10.3 parts of cobalt sulphate heptahydrate are stirred under reflux with 100 parts of water in an atmosphere of nitrogen for 15 minutes. The solution is allowed to cool to 80° and 11.3 parts of triethylene tetramine are added and the solution stirred for a further 15 minutes under reflux in an atmosphere of nitrogen and then cooled to 30°. 4.2 parts of sodium carbonate are added followed by the solid described in the paragraph above. The mixture is stirred under nitrogen under reflux for 20 minutes and then at 20° for 16 hours. The precipitate is collected by filtration, thoroughly washed with alcohol (3 × 50 parts) and dried.

16.8 Parts of aniline-2,5-disulphonic acid are dissolved in 250 parts of water at pH 6–7 and the solution cooled to 0–5° C. It is then added to a stirred suspension of cyanuric chloride prepared by adding a solution of 13.64 parts of cyanuric chloride in 50 parts of acetone to a stirred mixture of 80 parts of ice, 80 parts of water and one part of calsolene oil. The mixture is stirred at 0–5° C for 2½ hours, the pH being maintained at 6–7 by the occasional addition of 2N sodium carbonate solution. The solution is screened and the cobalt complex described in the previous paragraph is added. The mixture is then stirred at 35–40° for 1½ hours, the pH being maintained at 8–9 by means of occasional addition of 2N sodium carbonate solution. The solution was screened and salted to 50 percent w/v potassium acetate. After stirring for 1 hour at 5–10° the dyestuff was collected by filtration and purified by dissolving in 150 parts of water and the solution added to 1,500 parts of methylated spirits (74 OP). The dyestuff

Example 68

A solution of 3.3 parts of 5-benzoylaminoaniline-2-sulphonic acid in 50 parts of water and 5 parts of 2N sodium carbonate solution is cooled to 0–5° C and diazotized with three parts of 36 percent hydrochloric acid and 0.7 parts of sodium nitrite in five parts of water. The diazo suspension is added during 15 minutes at 0–5° C with stirring to a solution of 2.1 parts of 3-acetylamino-1-ethyl-6-hydroxy-4-methylpyrid-2-one in 100 parts of water and eight parts of sodium acetate. Stirring is continued for a further 16 hours at 0–5° C. The produce is filtered off, washed with 2.5 percent brine solution and dried.

When applied to nylon 66 from a weakly acid bath the dyestuff yields a very greenish yellow shade having good fastness to wet treatments and to light.

Example 69

When the 3.3 parts of 5-benzoylaminoaniline-2-sulphonic acid in Example 68 are replaced with 3.0 parts of 4-aminoazobenzene-4'-sulphonic acid a dyestuff is obtained which dyes nylon from a weakly acid bath a bright orange shade having good fastness to wet treatments and to light.

Example 70

3.46 parts of aniline-3-sulphonic acid is dissolved in 100 parts of water and 10 parts of 2N sodium carbonate solution. The solution is cooled to 0–5° C, acidified with six parts of 36 percent aqueous hydrochloric acid and diazotized with 1.4 parts of sodium nitrite in 10 parts of water.

A solution of 2.74 parts of 2-methoxy-5-methylaniline in 100 parts of water and three parts of 36 percent hydrochloric acid is added to the diazo solution during 15 minutes at 0–5° C and the mixture is stirred for a further 2 hours at 0–5° C. The product is filtered off, washed with 2.5 percent brine solution and dried.

A solution of 3.9 parts of the above aminomonoazo dyestuff in 100 parts of water and three parts of 30 percent aqueous sodium hydroxide solution is cooled to 0–5°C and 1.4 parts of sodium nitrite in 10 parts of water is added. The dyestuff is precipitated with sodium chloride, 10 parts of 36 percent hydrochloric acid are added and the suspension is stirred for a further 4 hours at 0–5° C. The solid diazo is filtered off, washed with cold 5 percent brine, suspended in 100 parts of cold water and added to a solution of 2.1 parts of 3-acetylamino-1-ethyl-6-hydroxy-4-methylpyrid-2-one in 100 parts of water and eight parts of sodium acetate. After stirring for a further 16 hours at 0–5° C the product is filtered off, washed with 5 percent brine solution and dried.

When applied to nylon from a weakly acid bath the dyestuff yields a bright scarlet shade having good fastness to wet treatments and to light.

Example 71

A solution of 3.1 parts of β-[4-aminophenylsulphonylamino]ethyl-pyridinium chloride in 30 parts of water and 2.5 parts of 31.5 percent aqueous hydrochloric acid is diazotized at 0–5° C with a solution of 0.7 parts of sodium nitrite in five parts of water added over 10 minutes. The diazo solution thus obtained is added at 0–5°C to a solution of 2.1 parts of 1-ethyl-3-acetylamino-4-methyl-6-hydroxypyrid-2-one and 2.8 parts of sodium acetate trihydrate in 50 parts of water over a period of 15 minutes. The mixture is stirred for 30 minutes at 0–5° C, and the product precipitated with the addition of 20 parts of sodium chloride. After stirring for a further hour at 0–5° C, the product is filtered off, washed with a little 20 percent brine and dried at 40–45°C in a vacuum.

When applied to polyacrylonitrile from a neutral or weakly acidic dyebath, a very greenish-yellow shade with good fastness properties is obtained.

Example 72

When the 3.1 parts of β-[4-aminophenylsulphonylamino]ethyl-pyridinium chloride in Example 71 is replaced by 2.7 parts of m-aminophenyltrimethylammonium bromide hydrochloride, there is obtained a dyestuff which dyes polyacrylonitrile fibers a greenish-yellow shade of good fastness properties.

Example 73

By replacing the 3.1 parts of β-[4-aminophenylsulphonyl amino]ethylpyridinium chloride in Example 71 by 3.84 parts of β-[4-amino-2,5-dichlorophenylsulphonylamino]-ethylpyridinium chloride, a dyestuff producing a very greenish-yellow shade of good fastness properties on acrylic fibers is obtained.

Example 74

When the 3.1 parts of β-[4-aminophenylsulphonylamino] ethyl-pyridinium chloride in Example 71 is replaced by 2.93 parts of 4-aminophenylaminocarbonylmethyl-pryidinium chloride, there is obtained a dyestuff which, when applied to polyacrylonitrile from neutral or weakly acidic baths, produces a yellow shade of good fastness properties.

Example 75

5.5 parts of a 14 percent aqueous solution of sodium nitrite are added over 30 minutes to a stirred suspension of 1.38 parts of o-nitroaniline in a mixture of 20 parts of water and four parts of a concentrated aqueous solution of hydrochloric acid at 0–5° C and the mixture is stirred for 3 hours at the same temperature. The mixture is filtered, the filtrate is treated with sulphamic acid to remove excess nitrous acid and is then added to a solution of 2.3 parts of 3-acetylamino-1-ethyl-6-hydroxy-4-methylpyrid-2-one in 150 parts of water containing four parts of sodium hydroxide and 15 parts of sodium acetate at a temperature between 0–5° C. The mixture is stirred 30 minutes and the precipitated dyestuff filtered off, washed by water and dried.

When dispersed in aqueous medium the dyestuff dyes aromatic polyester textile materials in reddish yellow shades having excellent fastness properties.

Example 76

2.6 parts of 5-(2'-nitrophenyl-azo)-3-acetylamino-1-ethyl-6-hydroxy-4-methylpyrid-2-one are dissolved in 20 parts of 96 percent sulphuric acid, the solution heated to 90° C and maintained at this temperature for 1½ hours. The mixture is then cooled to room temperature, drowned into 200 parts of cold water and the precipitated dyestuff collected by filtration, washed well by water and dried.

When dispersed in aqueous medium the dyestuff dyes aromatic polyester textile material in reddish orange shades having excellent fastness properties. It differs from the starting material in that the acetylamino group has been hydrolyzed to an amino group.

The following Table described further examples of dyestuffs of the invention, being obtained in similar manner to Example 75 by diazotizing the amine of column 2 and coupling with the compound named in column 3. Column 4 gives the shade obtained from the new dyestuff.

| Example | Amine | 6-hydroxy-pyrid-2-one: | Shade |
|---|---|---|---|
| 77 | p-Nitroaniline | 1-ethyl-4-methyl-3-acetylamino. | Reddish-yellow. |
| 78 | 4-methyl-2-nitroaniline. | do | Orange. |
| 79 | 4-methoxy-2-nitroaniline. | do | Do. |
| 80 | 2,4-dichloroaniline | do | Reddish-yellow. |
| 81 | 4-aminoazobenzene | do | Reddish-orange. |
| 82 | 1-naphthylamine | do | Do. |
| 83 | 1-aminoanthraquinone. | do | Orange. |
| 84 | 7-chloro-6-amino lepidone. | do | Do. |
| 85 | m-Nitroaniline | do | Yellow. |
| 86 | o-Nitroaniline | 1-phenyl-4-methyl-3-benzoylamino. | Reddish-yellow. |
| 87 | do | 1-(o-chlorophenyl)-4-methyl-3-benzoylamino. | Do. |
| 88 | do | 1-ethyl-4-methyl-3-benzoylamino. | Do. |
| 89 | do | 1-ethyl-4-methyl-3-phthalimido. | Reddish-yellow. |
| 90 | do | 1-phenyl-4-methyl-3-acetylamino. | Do. |
| 91 | p-Nitroaniline | do | Do. |
| 92 | m-Nitroaniline | do | Yellow. |

Example 93

By replacing the 3.1 parts of β-[4-aminophenylsulphonyl amino]ethyl-pyridinium chloride in Example 71 by 2.62 parts of 4-amino-3-nitrophenyltrimethylammonium chloride, a dyestuff producing a greenish-yellow shade with good fastness properties on acrylic fibers is obtained.

Example 94

A solution of 6.9 parts of the dyestuff prepared in Example 71 in 160 parts of water containing 32 parts of concentrated hydrochloric acid is heated at 100° C for 90 minutes, cooled to room temperature and salted with 14 parts of sodium chloride. The product, the dyestuff derived from the 3-aminopyriodone, is filtered off and dried.

When applied to polyacrylonitrile from a neutral or weakly acidic dyebath, an attractive reddish-yellow shade with good fastness properties is obtained.

We claim:
1. A dyestuff having the formula:

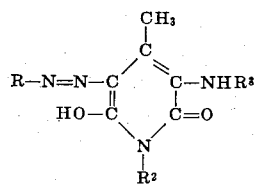

wherein R is selected from sulphophenyl, disulphophenyl, sulphonaphthyl, disulphonaphthyl, trisulphonaphthyl, disulpho-nitrostilbenyl, methoxysulphophenyl, β-sulphato-ethylsulphonylphenyl, methoxy-β-sulphatoethylsulphonylphanyl, sulpho-β-sulphatoethylsulphonylnaphthyl and disulphophenylazo methyl methoxyphenyl, R² is selected from methyl, ethyl, benzyl, butyl and tolyl, and R³ is

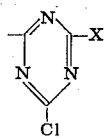

where X is selected from Cl, NH₂, sulphoanilino, N-sulphomethyl anilino, disulphoanilino, CH₃O— and sulphonaphthylamino, 5-chloro-6-methyl-2-methylsulphonylpyrimid-4-yl, 2,3-dichloroquinoxalin-6-ylcarbonyl, trichloropyrimidyl, β-(4,5-dichloropyradoz-3-on-1-yl)propionyl, β-phenylsulphonylpropionyl, acryloyl, 3,6-dichloropyridazin-4-ylcarbonyl, dichloropyrimidyl, 5-bromo-dichloropyrimidyl, 5-cyanodichloropyrimidyl, dichloropyrimid-5-ylcarbonyl, dichloropyrimid-5-ylsulphonyl, 2-chlorobenzthiazol-6-ylcarbonyl, 1,4-dichlorophthalazin-6-yl carbonyl, β-bromopropionyl, 2,2,3,3-tetrafluorocyclobutylcarbonyl, 2,3,3-trifluorocyclobut-1-enylcarbonyl, β-(2,2,3,3-tetrafluorocyclobutyl)acryloyl, β-(2,3,3-trifluorocyclobut-1-enyl)acryloyl, or sulphatoethylsulphonyl.

2. A dyestuff having the formula:

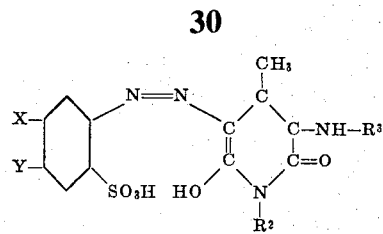

wherein one of X and Y is H or SO₃H and the other is a group of the formula:

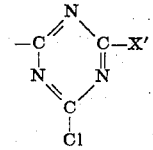

where X' is selected from Cl, sulphoanilino, disulphonaphthylamino and trisulphonaphthylamino, R² is lower alkyl, and R³ is selected from lower alkanoyl, benzoyl, nitrobenzoyl, phthaloyl and toluenesulphonyl.

3. A dyestuff having the formula

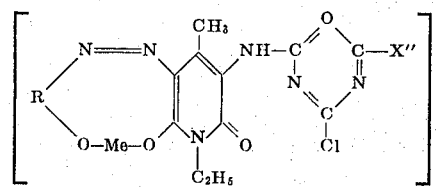

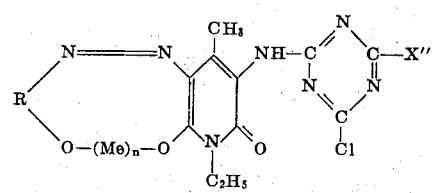

wherein R is selected from o-phenylene and o-naphthylene having up to two substituents selected from NO₂, Cl and SO₃H, X" is selected from Cl and sulphoanilino, Me represents a metal atom selected from Co, Cr, Cu and Ni and n has a value of ½ when Me is Co or Cr and 1 when Me is Cu or Ni.

4. A dyestuff having the formula:

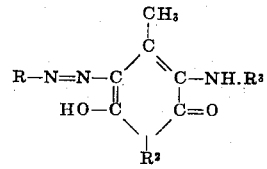

wherein R is selected from nitrophenyl, nitrotolyl, nitroanisyl, dichlorophenyl, phenylazophenyl, naphthyl, anthraquinonyl, and methyl-chloro-quinolin-2-on-yl, R² is selected from ethyl, phenyl and chlorophenyl, and R³ is selected from H, acetyl, benzoyl and phthaloyl.

* * * * *